United States Patent [19]
Kumomura

[11] Patent Number: 5,963,926
[45] Date of Patent: Oct. 5, 1999

[54] COMPUTER IMPLEMENTED METHOD, SYSTEM AND APPARATUS FOR PROCESSING VARIOUS TRANSACTIONS USING A PLURALITY OF TRANSACTION CARDS

[75] Inventor: Akira Kumomura, Kawasaki, Japan

[73] Assignee: Hitachi, Ltd., Tokyo, Japan

[21] Appl. No.: 08/810,470

[22] Filed: Mar. 4, 1997

[30] Foreign Application Priority Data

Mar. 4, 1996 [JP] Japan ................................. 8-045824

[51] Int. Cl.⁶ ............................................ G06F 17/60
[52] U.S. Cl. .......................... 705/41; 705/2; 705/4; 705/26; 705/35; 705/37; 705/38; 705/40; 705/42; 705/43; 235/379; 235/380; 380/25
[58] Field of Search ...................... 705/2, 40, 41; 395/241; 379/91, 266; 382/240; 235/375, 380; 380/25

[56] References Cited

U.S. PATENT DOCUMENTS

| | | | |
|---|---|---|---|
| 4,689,478 | 8/1987 | Hale et al. | 235/380 |
| 4,858,121 | 8/1989 | Barber et al. | 705/2 |
| 5,324,922 | 6/1994 | Roberts | 235/375 |
| 5,428,684 | 6/1995 | Akiyama et al. | 380/25 |
| 5,457,305 | 10/1995 | Akel et al. | 380/24 |
| 5,461,217 | 10/1995 | Claus | 235/380 |
| 5,477,040 | 12/1995 | Lalonde | 235/380 |
| 5,526,409 | 6/1996 | Conrow et al. | 379/91.02 |
| 5,590,038 | 12/1996 | Pitroda | 705/41 |
| 5,727,089 | 3/1998 | Ray et al. | 382/240 |
| 5,793,861 | 8/1998 | Haigh | 379/266 |

FOREIGN PATENT DOCUMENTS

| | | |
|---|---|---|
| 0232058A2 | 1/1987 | European Pat. Off. . |
| 1 573 466 | 8/1980 | United Kingdom . |

*Primary Examiner*—Allen R. MacDonald
*Assistant Examiner*—M. Irshadullah
*Attorney, Agent, or Firm*—Antonelli, Terry, Stout & Kraus, LLP

[57] ABSTRACT

A method, apparatus and computer program for processing plural types of transactions by a transaction processor connected to plural companies of different industries via a network. Use of the invention enables the efficient performance of a variety of transactions related to insurance utilizing one or a plurality of cards. In the invention the insurance card of a transactor is input, and a transaction screen including transaction keys related to preset transactions appropriate to the transactor is displayed. A transaction key showing a desired transaction is selected on the displayed screen and another card or other plurality of cards required for the desired transaction are inserted sequentially. The personal identification numbers of the cards are entered, and loan, inquiry, payment of insurance, contract, voidance/cancellation of a contract or payment of a premium transaction can be executed.

47 Claims, 16 Drawing Sheets

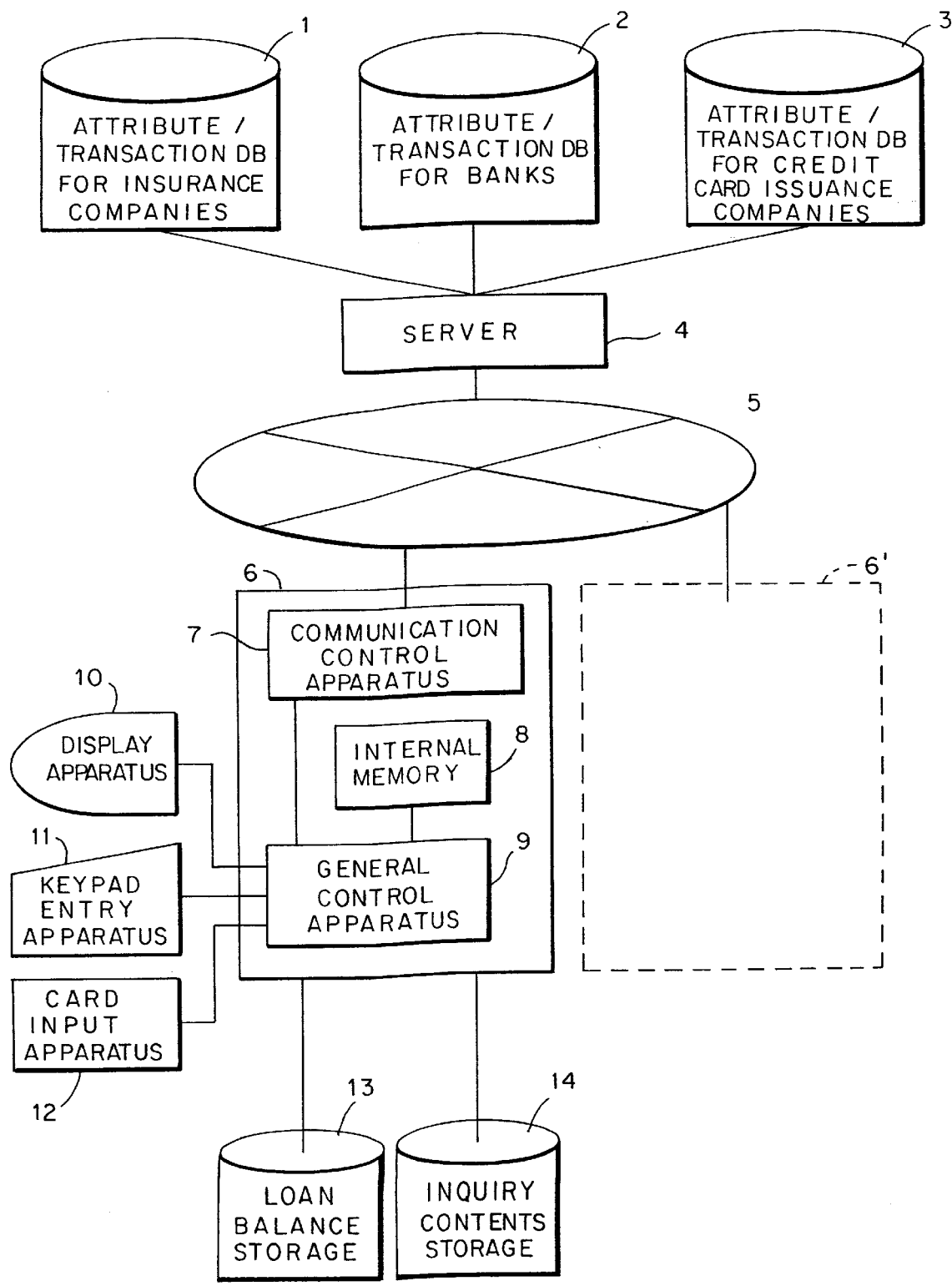

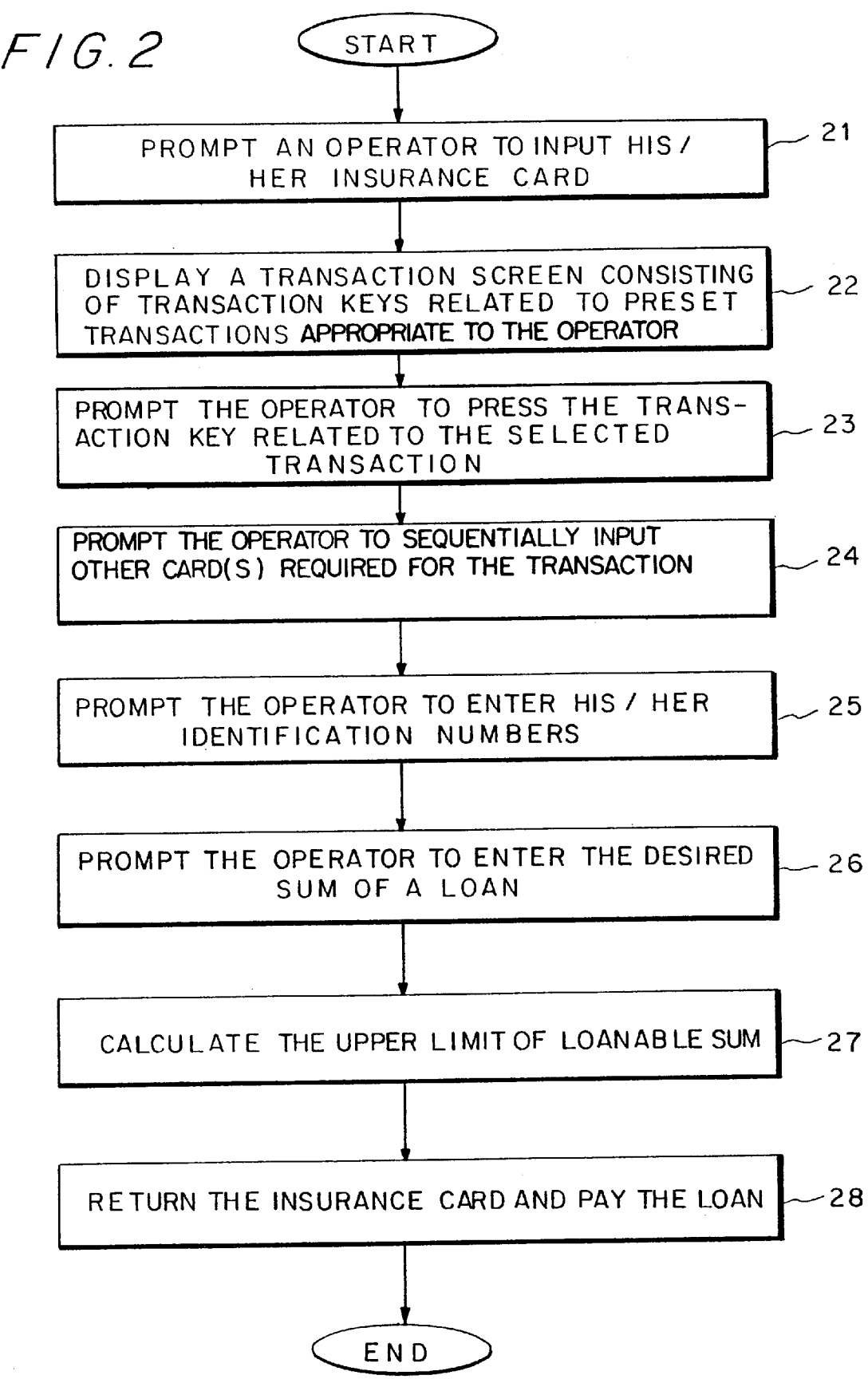

| NAME | ADDRESS | DATE OF BIRTH | JOB | TELEPHONE NUMBER |
|---|---|---|---|---|
| ICHIRO TANAKA | YOKOHAMA CITY | 1970/3/3 | OFFICE WORKER | 123-4567 |

| TEN THOUSAND YEN | A THOUSAND YEN | A HUNDRED YEN | TEN YEN | ONE YEN |
|---|---|---|---|---|
| 8 | 9 | 2 | 4 | 0 |

| TYPE OF INDUSTRY | CONTENTS OF TRANSACTION | PAYMENT PER MONTH | BALANCE | LOANED SUM | --- |
|---|---|---|---|---|---|
| INSURANCE COMPANY | PENSION INSURANCE | 20000 | 350000 | 40000 | --- |
| BANK | FIXED DEPOSIT | 10000 | 500000 | 20000 | --- |
| CREDIT CARD ISSUANCE COMPANY | LOAN BY CARD |  | 30000 | 10000 | --- |
| ⋮ | ⋮ | ⋮ | ⋮ | ⋮ | ⋮ |

FIG. 4A
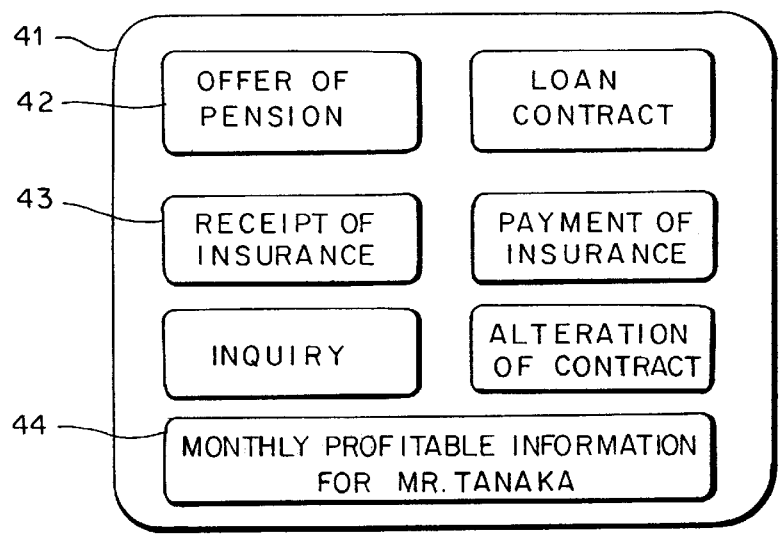
FIG. 4B
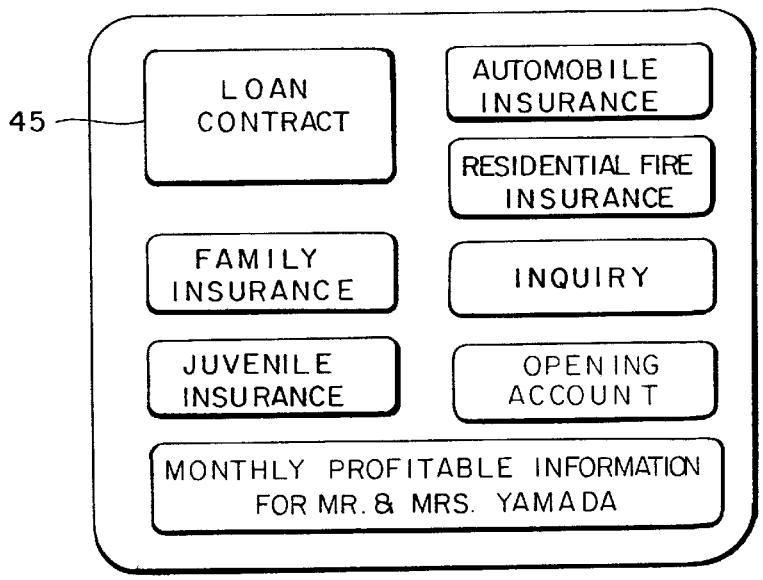
FIG. 4C
| NO. | NAME | AGE | MARITAL STATUS | YEARS SINCE MARRIAGE | MAIN TRANSACTION |
|---|---|---|---|---|---|
| 1 | ICHIRO TANAKA | 65 | YES | 35 | PENSION |
| 2 | HANAKO YAMADA | 34 | YES | 2 | LOAN |

FIG. 5

| NO. | NAME | INSURANCE CARD 51 | | BANK CARD 52 | | CREDIT CARD 53 | |
|---|---|---|---|---|---|---|---|
| | | TRANSACTION NUMBER | PERSONAL IDENTIFICATION NUMBERS | ACCOUNT NUMBER | PERSONAL IDENTIFICATION NUMBERS | CARD NUMBER | PERSONAL IDENTIFICATION NUMBERS |
| 1 | ICHIRO TANAKA | 1234-5678-900 | 2111 | 1234567 | 3111 | 1212-1313-1414-1515 | 4111 |
| 2 | HANAKO YAMADA | 2222-3333-444 | 5555 | 1356789 | 5555 | 1212-1414-1515-1818 | 5555 |
| --- | --- | --- | --- | --- | --- | --- | --- |

FIG. 6A

| NO. | TRANSACTION NUMBER | NAME | TYPE OF CONTRACT | INSURANCE | UPPER LIMIT SUM OF LOAN |
|---|---|---|---|---|---|
| 1 | 1234-5678-900 | ICHIRO TANAKA | LUMP SUM PAYMENT ENDOWMENT INSURANCE | TWENTY MILLION YEN | FIVE HUNDRED THOUSAND YEN |
| 2 | 2222-3333-444 | JIRO SUZUKI | PENSION INSURANCE | FIFTY MILLION YEN | ONE MILLION YEN |
| ⋮ | ⋮ | ⋮ | ⋮ | ⋮ | ⋮ |

FIG. 6B

| NO. | ACCOUNT NUMBER | NAME | CONTENTS OF TRANSACTION | BALANCE OF DEPOSIT | UPPER LIMIT SUM OF LOAN |
|---|---|---|---|---|---|
| 1 | 1234567 | ICHIRO TANAKA | FIXED DEPOSIT | FOUR MILLION YEN | THREE MILLION YEN |
| 2 | 1356789 | SABURO KOBAYASHI | INSTALLMENT SAVINGS | ONE MILLION YEN | ONE HUNDRED THOUSAND YEN |
| ⋮ | ⋮ | ⋮ | ⋮ | ⋮ | ⋮ |

FIG. 6C

| NO. | CARD NUMBER | NAME | TYPE OF CARD | SUM OF PURCHASE | UPPER LIMIT SUM OF LOAN |
|---|---|---|---|---|---|
| 1 | 1212-1313-1414-1515 | ICHIRO TANAKA | GENERAL | FOUR HUNDRED THOUSAND YEN | ONE HUNDRED THOUSAND YEN |
| 2 | 1212-1414-1515-1818 | GORO YAMAMOTO | GENERAL | FIVE HUNDRED THOUSAND YEN | TWO HUNDRED THOUSAND YEN |
| ⋮ | ⋮ | ⋮ | ⋮ | ⋮ | ⋮ |

FIG. 6D

| NAME | LOAN UPPER LIMIT SUM OF INSURANCE COMPANY | LOAN UPPER LIMIT SUM OF BANK | LOAN UPPER LIMIT SUM OF CREDIT CARD ISSUANCE COMPANY | TOTAL |
|---|---|---|---|---|
| ICHIRO TANAKA | FIVE HUNDRED THOUSAND YEN | THREE HUNDRED THOUSAND YEN | ONE HUNDRED THOUSAND YEN | THREE MILLION SIX HUNDRED THOUSAND YEN |

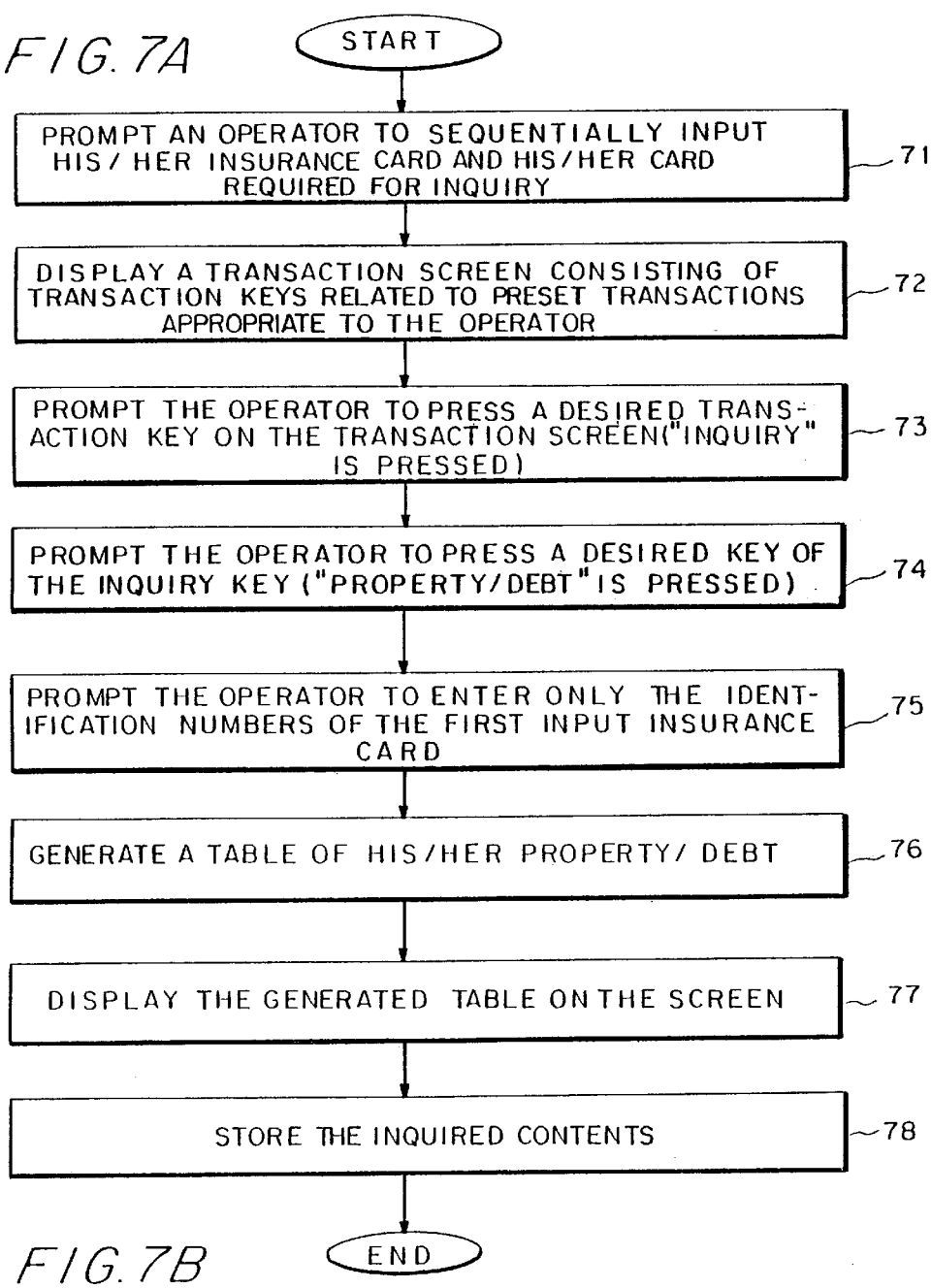
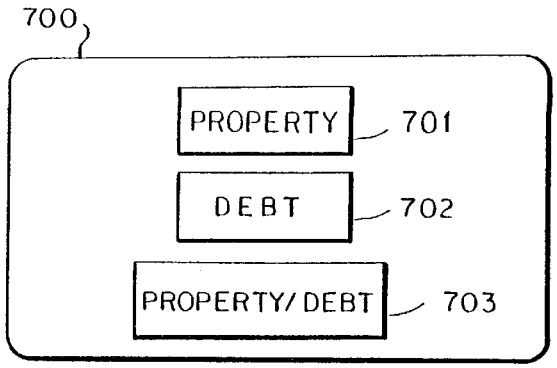

FIG. 8A

| NO. | TRANSACTION NUMBER | NAME | TYPE OF CONTRACT | TOTAL INSURANCE 81 | SUM LOANED TO CONTRACTOR 82 |
|---|---|---|---|---|---|
| 1 | 1234-5678-900 | ICHIRO TANAKA | LUMP SUM PAYMENT ENDOWMENT INSURANCE | ONE MILLION FIVE HUNDRED THOUSAND YEN | FOUR HUNDRED THOUSAND YEN |
| 2 | 2222-3333-444 | JIRO SUZUKI | PENSION INSURANCE | THREE MILLION YEN | NINE HUNDRED THOUSAND YEN |
| ⋮ | ⋮ | ⋮ | ⋮ | ⋮ | ⋮ |

FIG. 8B

| NO. | ACCOUNT NUMBER | NAME | CONTENTS OF TRANSACTION | BALANCE OF DEPOSIT 83 | BALANCE OF CARD LOAN 84 |
|---|---|---|---|---|---|
| 1 | 1234567 | ICHIRO TANAKA | FIXED DEPOSIT /CARD LOAN | FOUR MILLION YEN | FIVE HUNDRED THOUSAND YEN |
| 2 | 1356789 | SABURO KOBAYASHI | INSTALLMENT SAVINGS/CARD LOAN | ONE MILLION YEN | ONE HUNDRED FIFTY THOUSAND YEN |
| ⋮ | ⋮ | ⋮ | ⋮ | ⋮ | ⋮ |

FIG. 8C

| PROPERTY ITEMS | SUM OF PROPERTY | DEBT ITEMS | SUM OF DEBT |
|---|---|---|---|
| TOTAL INSURANCE | ONE MILLION FIVE HUNDRED THOUSAND YEN | SUM LOANED TO CONTRACTOR | FOUR HUNDRED THOUSAND YEN |
| BALANCE OF DEPOSIT | FOUR MILLION YEN | BALANCE OF CARD LOAN | FIVE HUNDRED THOUSAND YEN |
| TOTAL PROPERTY | FIVE MILLION FIVE HUNDRED THOUSAND YEN 85 | TOTAL DEBT | NINE HUNDRED THOUSAND YEN 86 |

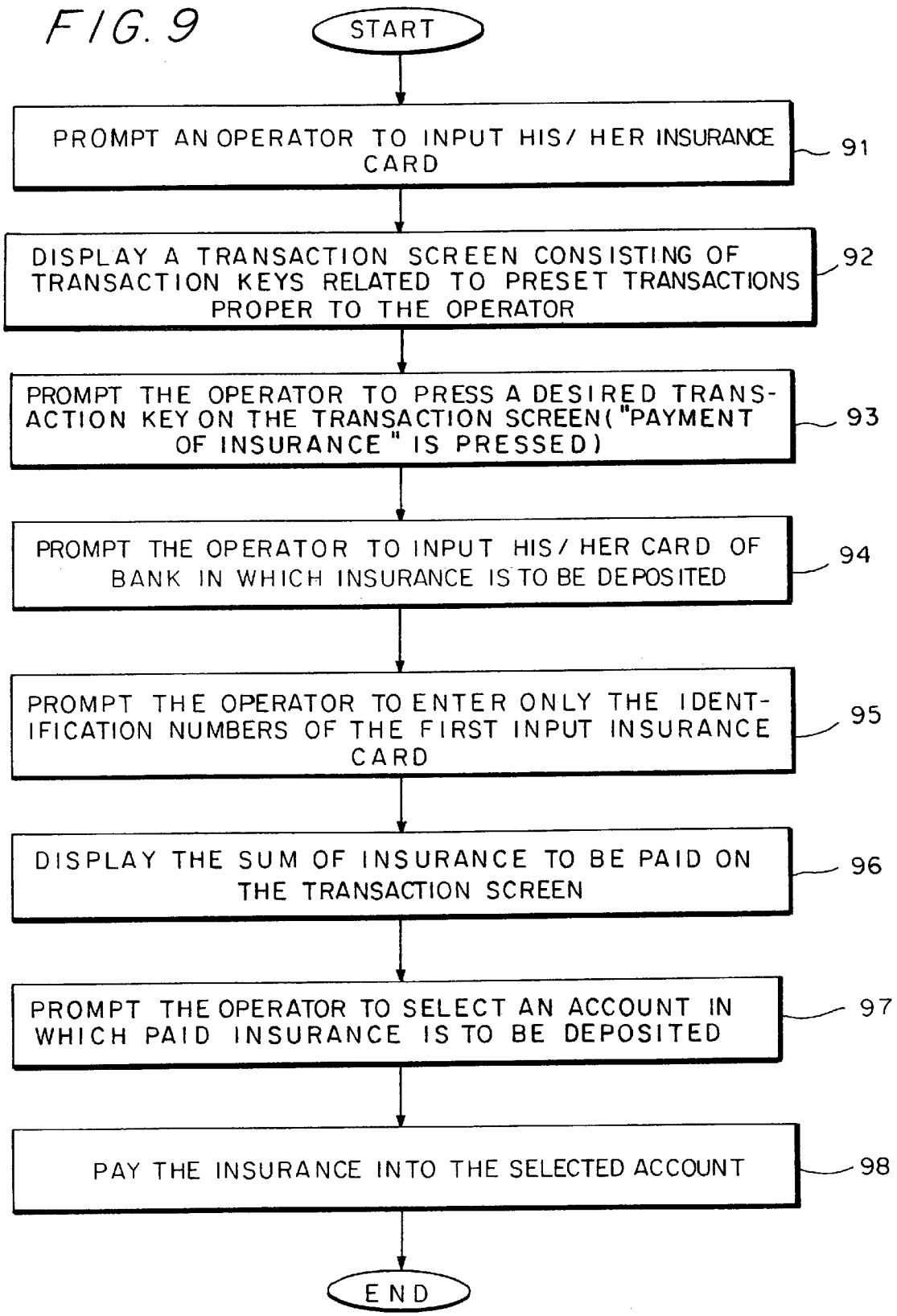

| NO. | ACCOUNT NUMBER | CONTENTS OF TRANSACTION | BALANCE OF DEPOSIT | APPLIED INTEREST |
|---|---|---|---|---|
| 1 | 1222567 | FIXED DEPOSIT | EIGHTEEN MILLION YEN | ANNUAL INTEREST: 1.5% |
| 2 | 1444567 | SAVINGS DEPOSIT | TWO MILLION YEN | ANNUAL INTEREST: 0.7% |

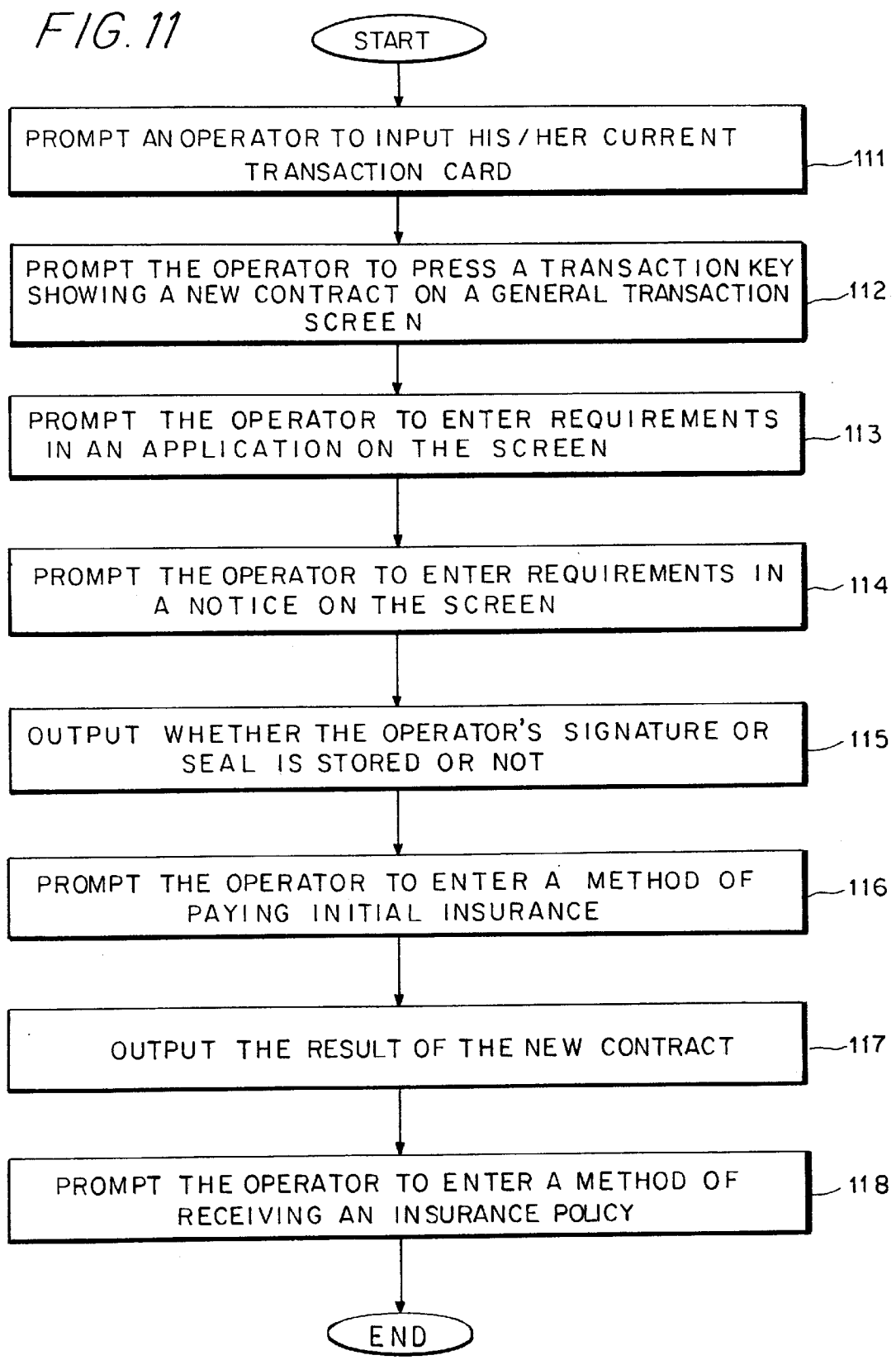

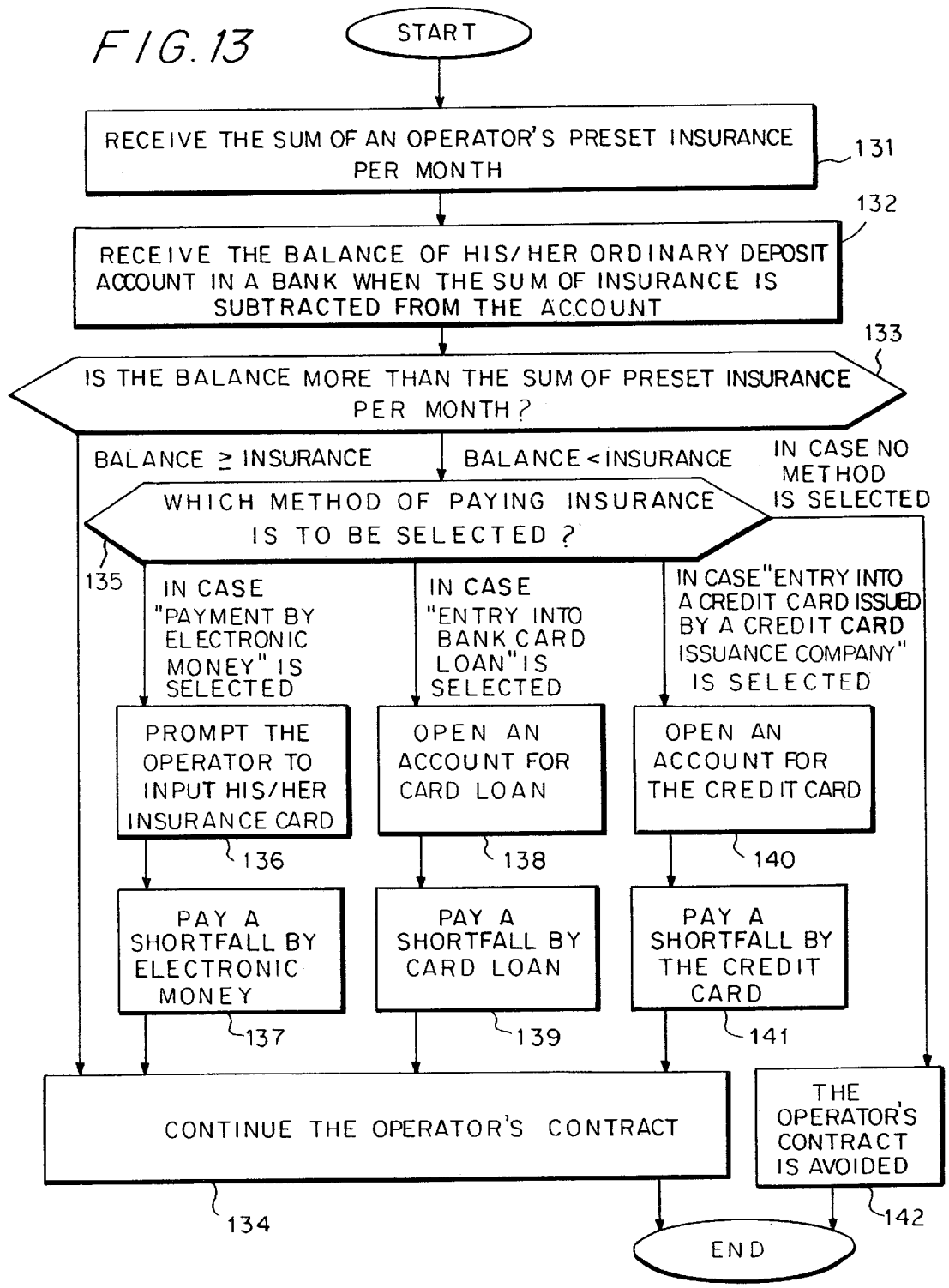

| NO. | TRANSACTION NUMBER | NAME | TYPE OF CONTACT | INSURANCE | INSURANCE PER MONTH(*) |
|---|---|---|---|---|---|
| 1 | 1234-5678-900 | ICHIRO TANAKA | LUMP SUM PAYMENT ENDOWMENT INSURANCE | TWENTY MILLION YEN | 50,000 |
| 2 | 2222-3333-444 | JIRO SUZUKI | PENSION INSURANCE | FIFTY MILLION YEN | 80,000 |
| ⋮ | ⋮ | ⋮ | ⋮ | ⋮ | ⋮ |

| NO. | ACCOUNT NUMBER | NAME | CONTENTS OF TRANSACTION | BALANCE OF ORDINARY DEPOSIT(*) |
|---|---|---|---|---|
| 1 | 1234567 | ICHIRO TANAKA | FIXED DEPOSIT | 40,000 |
| 2 | 1356789 | SABURO KOBAYASHI | INSTALLMENT SAVING | 90,000 |
| ⋮ | ⋮ | ⋮ | ⋮ | ⋮ |

| NO. | NAME | EXCESS OR SHORTFALL OF BALANCE(*) |
|---|---|---|
| 1 | ICHIRO TANAKA | -10,000 |
| 2 | SABURO KOBAYASHI | 10,000 |
| ⋮ | ⋮ | ⋮ |

| NO. | OPENED ACCOUNT NUMBER | CONTENTS OF TRANSACTION | BALANCE OF CARD LOAN(*) | APPLIED INTEREST |
|---|---|---|---|---|
| 1 | 2233445 | CARD LOAN | 8,000 | ANNUAL INTEREST: 10.5% |

| NO. | NEWLY ISSUED CARD NUMBER | TYPE OF CARD | BALANCE OF CREDIT CARD(*) | APPLIED INTEREST |
|---|---|---|---|---|
| 1 | 1212-1313-1414-1616 | GENERAL | 2,000 | ANNUAL INTEREST: 12.5% |

COMPUTER IMPLEMENTED METHOD, SYSTEM AND APPARATUS FOR PROCESSING VARIOUS TRANSACTIONS USING A PLURALITY OF TRANSACTION CARDS

BACKGROUND OF THE INVENTION

The present invention relates to a method, apparatus and computer program, for processing plural types of transactions using cards. More particularly, the present invention relates to a method, apparatus and computer program for processing a variety of transactions using one or a plurality of cards in an efficient manner by a transaction processor connected to plural institutions of different industries such as an insurance company, a bank, a credit card issuance company, a loan office and other financial institutions via a network.

A system for utilizing an automatic transaction processor such as an automatic teller machine (ATM) and performing a variety of transactions with a transactor is well know. Such a system is described on pages 57 to 71 of Financial Journal published in December, 1995 and is well known. This system is for utilizing a transaction card owned by a transactor such as a debit card issued by a bank via ATM to receive regular services of a bank such as withdrawal, deposit and transfer provided by ATM as other transactors.

A system for freely performing a variety of transactions among companies of different industries is also well known. Such a system is described in "Creating Electronic Commerce By The Internet" by T. Kimura, et al., Nikkei Multimedia, July, 1995, pp. 139–154. In this system, attribute/transaction information held in a common server is managed individually and a user can have access to transaction information freely.

Further, a system utilizing electronic money in payment is well known. Such a system described in "MODEX Will Expand the MONDEX System in Britain After Two Years" by Y. Ochi, Financial Journal, January, 1996. This system is for paying money by sending or receiving electronic money which is an electronic symbol of money and is stored in an IC chip embedded in a conventional plastic card.

The conventional method has the following problems:

If an insurance transaction such as loan and inquiry is performed utilizing an ATM operated by an insurance company, only one card issued by the insurance company is used for the transaction with the insurance company. However, if the contract of a new insurance via ATM in cooperation with a bank and a credit card issuance company, a loan based upon the contract of an insurance and a bank account and inquiry of an insurance, a bank account or a credit card are performed, transaction processing is required to be executed individually using a card for each transaction. Such processing is not very efficient.

Personal identification numbers are required for each card for every industry. If personal identification numbers for each card are different then each of these different personal identification numbers are required to be entered in order to perform a required processing. For the user such a requirement is inconvenient.

There is also a problem that the types and arrangement of transaction keys on the transaction screen of an ATM are fixed for all customers and transactions. Thus, an undesired transaction key is displayed in a main location of the screen and a transaction desired by a transactor cannot be necessarily performed efficiently.

SUMMARY OF THE INVENTION

An object of the present invention is to provide a method, apparatus and computer program for processing plural types of transactions using cards wherein plural cards of different industries can be utilized at one transaction terminal and a variety of insurance transactions can be efficiently performed.

Another object of the present invention is to provide a method, apparatus and computer program for processing plural types of transactions using cards wherein, if plural cards are used, only the entry of the personal identification numbers of an insurance card and a bank card for payment is required and as a result, operations for entry can be reduced.

Yet another object of the present invention is to provide a method, apparatus and computer program for processing plural types of transactions using cards, wherein a transaction screen is adapted to the contents of transactions of a transactor, from past to present transactions as well as the transactor's future schedule of transactions, and a transaction efficient to a transactor can be performed.

Still another object of the present invention is to provide a method, apparatus and computer program for processing plural types of transactions using cards wherein the transaction information of companies of different industries can be stored in a common server or in a chip of each IC card and as a result, an area for storing information and retrieval time can be reduced.

According to the present invention, a variety of transactions with an institution such as an insurance company using one or a plurality of cards are performed via a transaction processor such as personal computers inside/outside a shop, an ATM and a portable terminal.

First, one insurance card of a transactor is inserted. A transactor in this case means an insurant who joins the insurance of an insurance company or a depositor with an account in a bank and a person who actually operates a transaction processor. A transaction screen consisting of transaction keys related to preset transactions proper to a transactor is displayed. The position, type, shape and color of keys on this transaction screen can be changed or added according to the contents of transactions of the transactor. A transaction key related to a transaction selected on the displayed transaction screen is pressed. As the types of transactions, loan, receipt of insurance and others are provided. Other cards such as a bank card, a credit card and another insurance card required for the transaction are received. No other cards may be required depending upon a transaction and plural cards may be required.

Next, the personal identification numbers of the first inserted insurance card are entered. In case withdrawal occurs in the transaction of an insurance, such as if money is withdrawn via a bank card for the payment of insurance, the personal identification numbers of a card related to the withdrawal are entered.

The contract of a new insurance, the receipt of insurance, loan, inquiry, the payment of insurance and the cancellation of an insurance are performed. Particularly, in the case of a loan, a loan is performed based upon the total loanable limit sum of the received one or plural cards. In the case of inquiry, attribute information and transaction information of received cards are merged and the same information such as attribute information held by plural companies is displayed on the screen without redundancy. In the case of the repayment of insurance, it is determined whether paid insurance is deposited in the bank account of a transactor or not, and if the transactor does not have an account in a bank even though a deposit is selected, an account for the transactor is opened automatically.

Further, in the contracting of new insurance, if a transactor signs or seals when he/she applies for a bank card or a credit card, a new contract can be made by entering a requirement in an application on the screen and answering a notice in case the sum of money equivalent to initial insurance is deposited in his/her bank account. If the balance of a transactor's bank account is less than insurance and insurance cannot be paid, the transactor is automatically enrolled in a bank card loan or the credit of a credit card. If a transactor presses a transaction key showing the cancellation of his/her insurance, transaction keys for displaying total insurance and repayment and transaction keys for recommending the transactor to switch to another insurance are displayed on the screen.

BRIEF DESCRIPTION OF THE DRAWINGS

The present invention will be more apparent from the following detailed description when taken in conjunction with the accompanying drawings, in which:

FIG. 1 is a block diagram illustrating a system according to the present invention;

FIG. 2 illustrates the flow of processing showing an embodiment for a loan according to the present invention;

FIGS. 4A–4C illustrate transaction screens for an aged person and a newly married couple and an attribute file;

FIG. 5 illustrates a personal identification numbers table managed by a server;

FIGS. 6A–6D illustrate respective transaction tables of an insurance company, a bank and a credit card issuance company and a loan upper limit file;

FIGS. 7A and 7B illustrate the flow of processing illustrating an embodiment for inquiry and an inquiry screen according to the present invention;

FIGS. 8A–8C illustrate respective transaction tables of an insurance company and a bank and a property/debit table;

FIG. 9 illustrates the flow of processing illustrating an embodiment for paying insurance according to the present invention;

FIG. 11 illustrates the flow of processing illustrating an embodiment for a new contract according to the present invention;

FIG. 13 illustrates the flow of processing showing an embodiment related to the voidance of an insurance contract according to the present invention;

FIGS. 14A–14E illustrate respective transaction tables of an insurance company and a bank, a balance comparison table and an opened account record;

DETAILED DESCRIPTION OF THE PREFERRED EMBODIMENTS

Figures 3A, 3B, 3C, 3D:
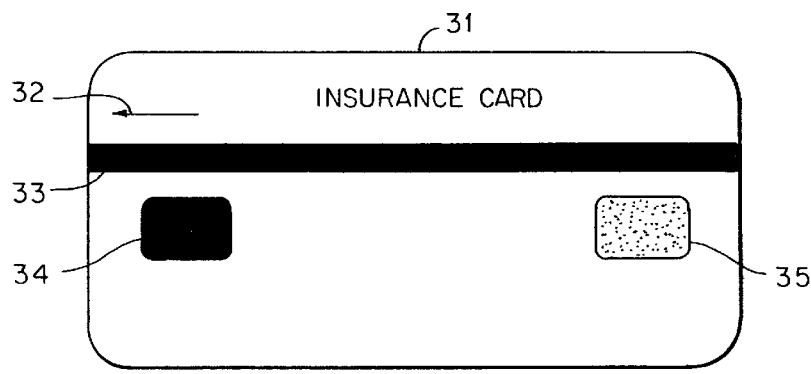
FIGS. 3A–3D illustrate the construction of an insurance card, an attribute information record, an electronic money record and a transaction information table.

Embodiments according to the present invention will be described below referring to the drawings.

FIG. 1 illustrates the constitution of a system according to the present invention. A server 4 is connected to an attribute/transaction database (DB) 1 for insurance companies, an attribute/transaction DB 2 for banks and an attribute/transaction DB 3 for credit card issuance companies, and a plurality of client servers 6, 6' are connected via a network 5. The server 4 in this case means a computer in a common center managed by insurance companies, banks and credit card issuance companies. A display 10, a keypad entry apparatus 11, a card input apparatus 12 and an external storage apparatus consisting of a loan balance storage 13 and an inquiry contents storage 14 are connected to the client server 6. This display 10 is provided with a touchpanel usually used in an ATM and can also function as the key entry apparatus 11.

Each client server 6, 6' constitutes a terminal which a customer, who is a transactor, uses and constitutes an insurance transaction network under control by the server 4. Only two servers are shown in FIG. 1, although in practice multiple servers are connected. Since an insurance transaction network can be constituted using well-known technology such as well-known electronic commerce (EC), a detailed description thereof is omitted here. For example, a personal computer can be used as the client server 6 and the client server contains a general control apparatus 9 including a CPU, internal memory 8 and a communication control apparatus 7 for controlling the communication of information via a network.

The display 10 is a unit for displaying information visibly such as a CRT display unit or a liquid crystal display and displays a transaction screen on which a customer who is a transactor transacts.

The keypad entry apparatus 11 is used for entering information for selecting the contents of a transaction and entering the desired sum of a loan and a desired item to be inquired in addition to entering personal identification numbers and for example, a mouse, a joystick or a keypad can be used as the keypad entry apparatus. A loan upper limit sum table described later for setting the upper limit sum of a loan to a customer is stored in the loan balance storage 13. The inquiry contents storage 14 is a storage for storing a variety of contents of inquiry related to a received card.

The general control apparatus 9 controls the overall client server 6 by a program input beforehand to enable operation. The control for displaying transaction keys related to transactions proper to a transactor on the display 10, the control for inputting plural cards via the card input apparatus 12 and the control for entering the personal identification numbers of the first input card via the keypad entry apparatus 11 are executed by this general control apparatus 9. Such processing can be executed by a software product installed beforehand.

Next, the flow of processing for a loan in this embodiment will be described referring to FIGS. 2 to 6. FIG. 2 illustrates the flow of processing for inputting the contents of a transaction to a client server 6, performing required processing and displaying the result of processing on the client server 6.

An insurance card of a transactor is input via the card input apparatus 12 in step 21 in FIG. 2. The input insurance card is shown in FIG. 3A. As shown in FIG. 3A, an insurance card 31 is inserted into an ATM in the direction 32 to be input. In the upper part of the card, a linear magnetic stripe 33 extended horizontally for storing an attribute information record shown in FIG. 3B is embedded and immediately under the magnetic stripe, an IC chip 34 for storing an electronic money record shown in FIG. 3C is provided on the left side and an IC chip 35 for storing a transaction information table shown in FIG. 3D is provided on the right side. As such, constitution of the card such as the arrangement of the IC chips 34 and 35 and the arrangement of a contact with a card reader/writer can be realized by a well-known method. Therefore, the description thereof is omitted.

In the above attribute information record shown in FIG. 3B, the information of the owner of a card such as his/her name, address and date of birth, job and telephone number is stored. In the electronic money record shown in FIG. 3C, the amount of electronic money to be stored in the IC chip 34 is stored. A format for storing electronic money is arbitrary, however. For example, each unit of money such as ten thousand yen and a thousand yen and the amount are stored. The transaction information table shown in FIG. 3D is attribute information related to a transactor and the type of a transaction related to the owner of an insurance card, the contents or the history is stored in a table format. When the insurance card of a transactor is input, a transaction screen consisting of transaction keys related to preset transactions proper to the transactor is displayed in step 22.

This transaction screen will be described below referring to FIGS. 4A–4C. First, an attribute file shown in FIG. 4C based upon an input insurance card is obtained from the attribute/transaction DB 1 for insurance companies shown in FIG. 1 via the server 4 and the network 5. In this file of a customer, the transaction characteristics of the customer such as a marital status 46 and a main transaction 47 are set. A transaction screen in view of such characteristics of a customer is displayed on the display means 10. FIG. 4A shows such an example. A transaction screen 41 shows a screen for Mr. Tanaka who is an aged person in a customers' file and as his main transaction is related to a pension, the frame and characters of a transaction key 42 is displayed larger than those of a transaction key 43 to highlight the transaction key 42. If a transaction is to be promoted in a particular month, it may be largely displayed in the lower part of the screen as a transaction key 44. FIG. 4B shows a screen dedicated to Mr. & Mrs. Yamada who are a newly married couple. As Mr. & Mrs. Yamada have need for loan, a loan is displayed and is highlighted as transaction key 45.

Next, the information of a transaction key related to a transaction selected by a transactor via the keypad entry apparatus 11 is entered on the transaction screen displayed on the display 10 via the general control apparatus 9 in step 23. Next, one or a plurality of other cards required for the transaction are input via the card input apparatus 12 sequentially in step 24 and the respective personal identification numbers are entered via the keypad entry apparatus 11 in step 25. Another card required for the transaction is a card by which companies enroll or a card by which bidirectional transaction processing is enabled in this system. It should be displayed on the screen in step 24 which card is to be input so as to inform a transactor.

Personal identification numbers are managed by the server 4 shown in FIG. 1 and are stored in a personal identification numbers table shown in FIG. 5. In this personal identification numbers table, the identification number of each card and respective personal identification numbers such as insurance card information 51, bank card information 52 and credit card information 53 are stored. In this embodiment, in the case of Mr. Tanaka to whom money is loaned, the personal identification numbers "3111" of his bank card are also entered in addition to the personal identification numbers "2111" of his insurance card. This time an example related to the loan is given. However, in the case of a transaction which is not related to withdrawal such as inquiry, only the personal identification numbers of a first input card have to be entered. As the personal identification numbers of the insurance card, the bank card and the credit card of Mr. Yamada are all set to "5555", his personal identification number "5555" has to be entered only once in any transaction. Though it is not desirable in view of security that the same personal identification numbers be used, this system is managed as described above because it is not efficient to enter the same personal identification numbers plural times, of course, this system may be constituted so that the same personal identification numbers are entered plural times.

After personal identification numbers are entered, a desired loan sum is entered via the keypad entry apparatus 11 in step 26. When the desired sum is entered, the order of companies by which a transactor is loaned can be determined. For example, if a desired loan sum is one million yen and the interest of loan is low in the order of an insurance company, a bank and a credit card issuance company, five hundred thousand yen equivalent to the upper limit of a loan may be loaned by an insurance company and five hundred thousand yen within the upper limit of a loan may be loaned by a bank. In this embodiment, the case that the sum equivalent to the upper limit of a loan is loaned will be described. After a desired loan sum is entered, the upper limit of a loan is totaled in step 27 and the electronic money equivalent to the desired loan sum is transferred to the insurance card 31.

This flow will be described referring to FIGS. 6A–6D. First, an insurance company transaction table shown in FIG. 6A is sent from the attribute/transaction DB 1 for insurance companies to the server 4, a bank transaction table shown in FIG. 6B is sent from the attribute/transaction DB 2 for banks to the server 4, a credit card issuance company transaction table shown in FIG. 6C is sent from the attribute/transaction DB 3 for credit card issuance companies to the server 4, the loan upper limit file shown in FIG. 6D of a transactor is generated, the upper limit sums of loan 61, 62 and 63 of the transactor in respective tables are totalized and the total sum is displayed on the display means 10 via the client server 6. If the sum is within the desired loan sum formerly entered, the loan sum is transferred to the electronic money record 34 of the insurance card shown in FIG. 3A via the card input apparatus 12. The loan sum may be stored in the loan balance storage 13 shown in FIG. 1 as the balance of a loan via the card input means 12.

As described above, when plural cards are inserted into an automatic transaction processor connected to an insurance company, transactions with plural companies can be processed at once.

Next, an inquiry transaction will be described referring to FIGS. 1, 2, 4, 7A–7B and 8A–8C.

As shown in FIG. 7A, the insurance card of a transactor and his/her card required for inquiry are input sequentially via the card input apparatus 12 in a step 71. In this embodiment, the property and debt of a transactor in an insurance company and a bank can be inquired at the same time. Therefore, a bank card is input sequentially after an insurance card. Next, a transaction screen is displayed in a step 72 as in the step 22 in FIG. 2. A transaction key "INQUIRY" on this displayed transaction screen is entered via the keypad entry apparatus 11 or pressed on the touchpanel of the display 10 in a step 73. "INQUIRY" on this transaction screen as the one shown in FIG. 4B is s elected causing the display of inquiry screen 700 illustrated in FIG. 7B. The inquiry screen 700 includes PROPERTY 701, DEBT 702 and PROPERTY/DEBIT 703 keys. If "PROPERTY/DEBT" key 703 of the inquiry screen 700 is entered or pressed in a step 74, the same method as in the step 73 is performed causing the display of PROPERTY/DEBT information. The same also occurs if any of the other keys, PROPERTY 701, or DEBT 702 are entered or pressed. As this transaction screen is like the format of the first transaction screen, the description is omitted here. Next, only the personal identification numbers of the first input insurance card of two input cards are entered via the keypad entry apparatus 11 in step 75. It is because in the case of a transaction not related to withdrawal, payment or a transfer such as inquiry, the enhancement of the operability of a transactor is regarded as being more important than the enhancement of security by entering personal identification numbers corresponding to all cards that only personal identification numbers of a first inserted card are entered and the input of those of a next inserted card is omitted. As withdrawal or others is/are not performed using the card the personal identification numbers of which are not entered, a detailed check by personal identification numbers of whether the owner of the card is a transactor or not is not required.

Total insurance 81 which is a property item and the loan sum to a contractor 82 which is a debt item in an insurance company transaction table shown in FIG. 8A, the balance of a deposit 83 which is a property item and the balance of card loan 84 which is a debt item in a bank transaction table shown in FIG. 8B are respectively extracted to generate a property/debt table shown in FIG. 8C in step 76. At this time, repeated "No.", "Name" and other items not related to "Property/Debt" in FIGS. 8A and 8B are used in the generated table nor displayed. As "No." and "Name" are the information of a transactor, they are not required to be displayed on the screen in this case and as "Transaction number" and "Account number" are only secondary information in relation to "Property/Debt", these are also not required to be displayed in this case. In response to the pressing or entering of the keys in the inquiry window 700 portions of the generated PROPERTY/DEBT table illustrated in FIG. 8C are displayed step 77. Thus, for example, if the PROPERTY key 701 is pressed or entered, all of the Property Items and the corresponding Sum of Property Items of the PROPERTY/DEBT table illustrated in FIG. 8C are displayed. However, if the card being processed is an insurance card, when the PROPERTY key 701 is pressed or entered only the Total insurance property item and its corresponding Sum of Property item and the Total property and its corresponding Sum of Property item are displayed. If the DEBT key 701 is pressed or entered all of the Debt Items and corresponding Sum of Debt items of the PROPERTY/DEBT table illustrated in FIG. 8C are displayed. If the PROPERTY/DEBT key 703 is pressed or entered the entire PROPERTY/DEBT table illustrated in FIG. 8C is displayed. When the contents of inquiry of property/debt are to be stored, the contents of inquiry can be stored in the inquiry contents storage 14 shown in FIG. 1.

Next, the payment of insurance will be described referring to FIGS. 1, 2, 6, 9 and 10.

The input of the insurance card of a transactor and the display of a transaction screen are performed in steps 91 and 92 in FIG. 9 by the same method as in the steps 21 and 22 shown in FIG. 2. A transaction key "PAYMENT OF INSURANCE" is pressed on the transaction screen in step 93 by the same method as in the step 73 in FIG. 7. Next, a bank card for depositing insurance is input via the card input apparatus 12 in a step 94. The card number may be entered via the keypad entry apparatus 11 in place of the card. Next, only the personal identification numbers of the first input insurance card are entered via the keypad entry apparatus 11 in a step 95. In the case of a deposit, the personal identification numbers of an account for the deposit are not required to be entered. This is because money is paid in the bank account differently from withdrawal and other transactions.

Figures 10A, 10B:
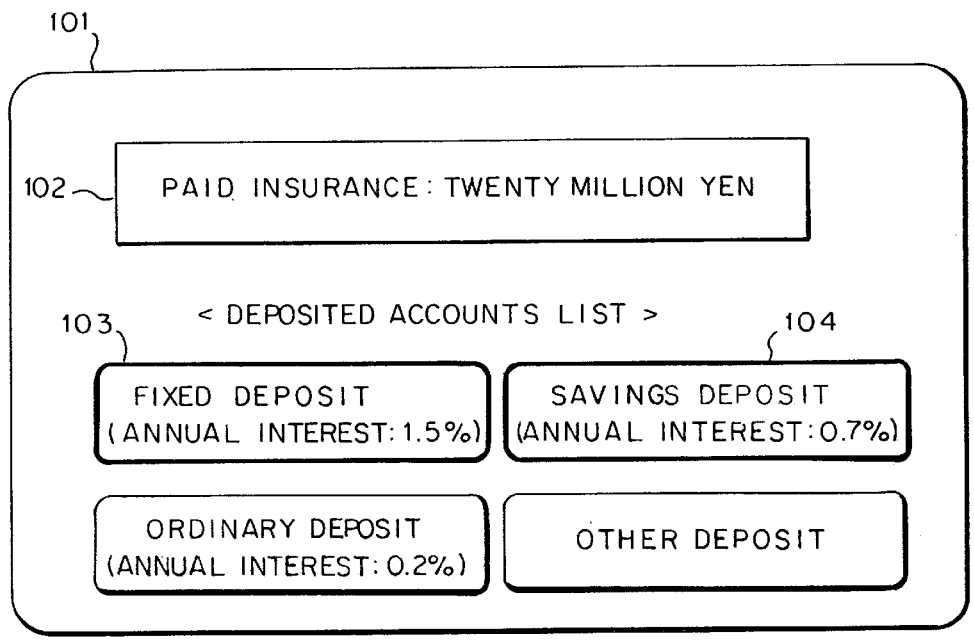
FIGS. 10A and 10B illustrate a screen for paying insurance in a transactor's bank account and an opened account deposit file.

Next, the sum of paid insurance sent from the insurance company transaction table shown in FIG. 6A via the network 5 is displayed on the transaction screen of the display 10 in step 96. It is displayed as in a display key 102 in the screen 101 in FIG. 10A. Next, an account in which the paid insurance is deposited is selected in step 97. In FIG. 10A, a fixed deposit (annual interest: 1.5%) 103 and installment savings (annual interest: 0.7%) 104 are selected. After the selection, the transactor is prompted to further enter the sums to be deposited in the respective accounts. Hereby, the sums to be deposited in the respective accounts can be set freely in view of the respective annual interest rates. In this embodiment, as shown in the items of the contents of a transaction 105 and the balance of a deposit 106 in FIG. 10B, eighteen million yen is specified so that it is deposited in a fixed deposit, two million yen is specified so that it is deposited in installment savings and the respective accounts for payment are automatically opened in step 98. The number of the opened account may be given in the order of requests for opening an account sent to the server 4 shown in FIG. 1 and serial numbers may be given to an individual transactor for the simplification of management.

Next, the contract of a new insurance will be described referring to FIGS. 1, 3, 11 and 12.

Figure 12A:
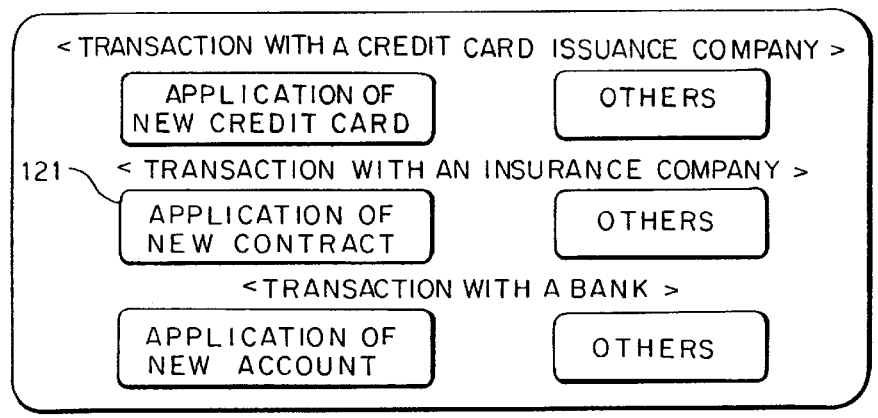
FIGS. 12A–12C illustrate a general transaction screen, a new contract screen and a contract conclusion/policy issuance screen.
Figure 12B:
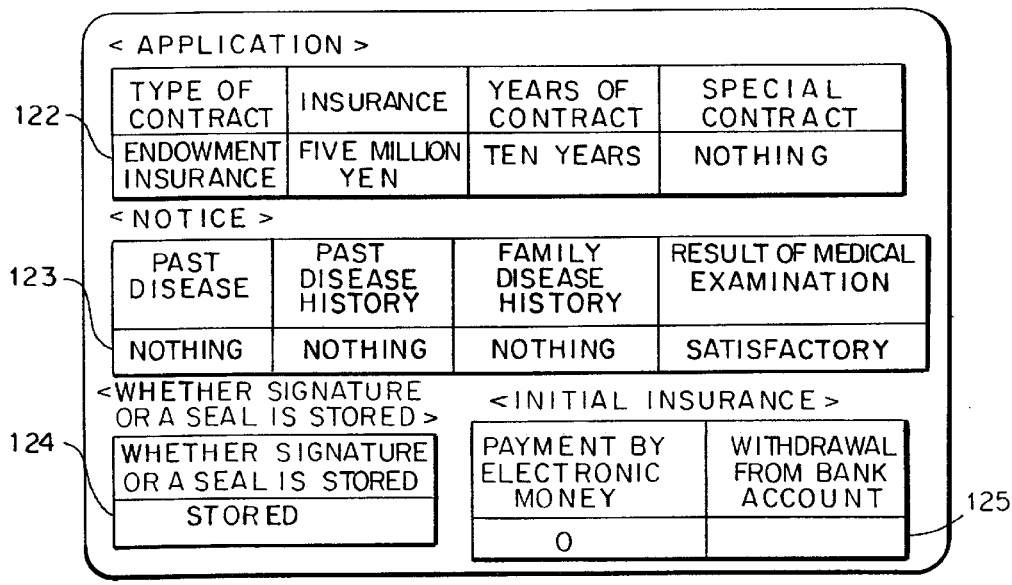
Figure 12C:
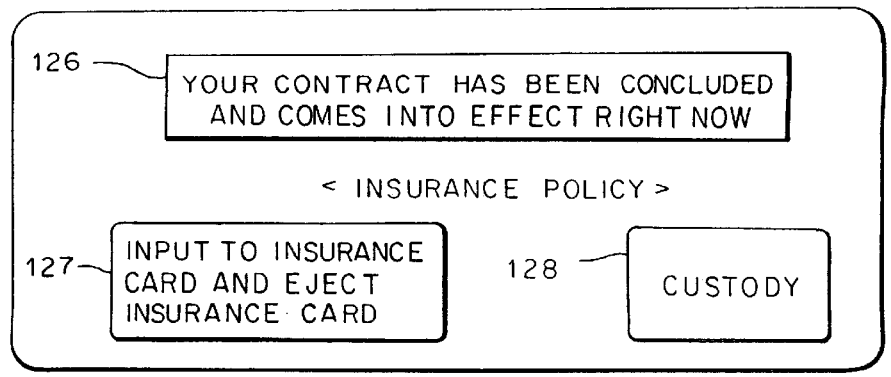

As shown in FIG. 11, first the current card is input via the card input means 12 in step 111. In this embodiment, a credit card issued by a credit card issuance company is input. Next, when the credit card is input, a transaction key showing a new contract on a general transaction screen displayed on the display means 10 is selected via the keypad entry apparatus 11 in step 112 and the transaction screen for a new contract is displayed on the display means 10. In the uppermost location of the general transaction screen shown in FIG. 12A, a transaction key for a credit card issuance company is displayed because a credit card is input. When the transaction key showing application for a new contract 121 is selected on the general transaction screen shown in FIG. 12A, a new contract screen is displayed as shown in FIG. 12B. The information of a requirement which is entered in an application 122 on the screen is obtained in step 113, the information of a requirement which is entered in a notice 123 under the application is obtained in step 114 and further, it is output as in a signature/seal history 124 in step 115 whether the information of a signature or seal of a transactor is stored or not. A signature and a seal in this signature/seal history are those for the input credit card.

Finally, a method of paying insurance is entered in step 116 as shown in the payment of initial insurance 125. As payment by electronic money is selected in this case, an electronic money card is input afterward. When such a chain of processing is finished, the attribute/transaction DB for insurance companies shown in FIG. 1 is updated via the network 5 and the server 4 and the result of a new contract is output in step 117. When a contract is made, words to the effect that the contract has been made are displayed on the display 10 as shown in 126 in FIG. 12C and the transactor is prompted to enter a method of receiving an insurance policy in step 118. If the transactor desires sending of an insurance card to which the information of the insurance policy is input, he/she presses a transaction key 127 showing sending of the insurance card so that the insurance card to the chip 35 for storing transaction information shown in FIG. 3A of which the information of the insurance policy is input is sent. If safe custody 128 is selected, the transactor's insurance policy is stored in the attribute/transaction DB for insurance companies and output to the transactor if necessary.

Next, the voidance of an insurance contract will be described referring to FIGS. 1, 13, 14 and 15.

FIG. 13 shows the flow of the payment of insurance by an automatic transaction processor. First, the information of fifty thousand yen stored in the item of insurance per month 143 set beforehand by a transactor in an insurance company transaction table shown in FIG. 14A is received in step 131. Next, the information of forty thousand yen stored in the item of the balance of his/her ordinary deposit 144 in a bank transaction table shown in FIG. 14B when the insurance is withdrawn is received in step 132. This is automatically performed at the timing of a due date input beforehand by the transactor. Next, the set insurance per month and the balance of the transactor's bank account when the insurance is withdrawn are compared in step 133 and, if the balance is more than the insurance, the contract is continued unconditionally in step 134.

Figure 15:
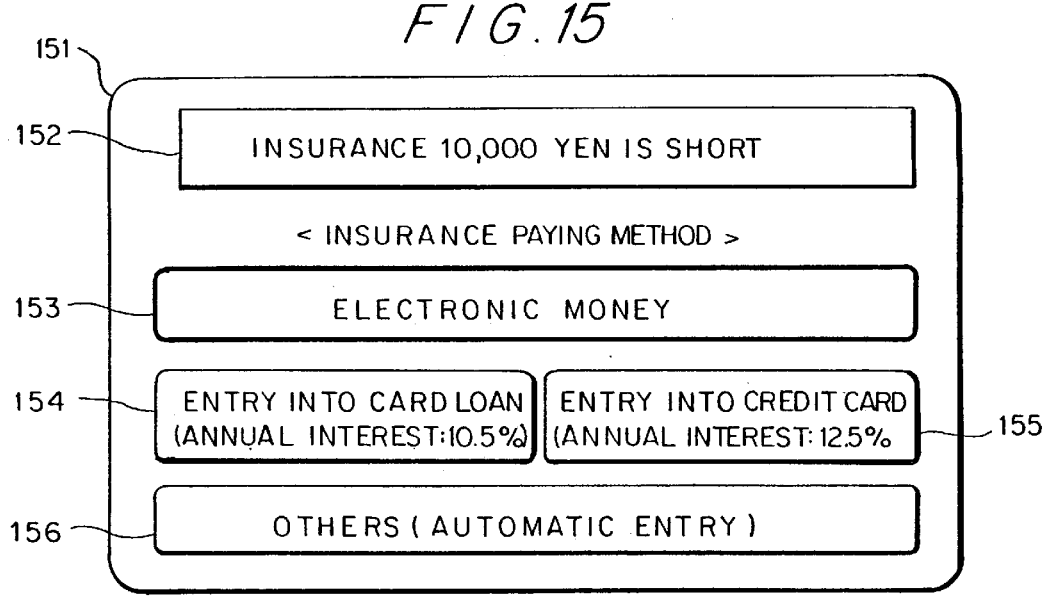
FIG. 15 illustrates a screen for selecting a method of paying insurance.

If the balance is less than the insurance, a screen 151 including warning 152 for selecting a method of paying insurance shown in FIG. 15 is displayed on the display 10 shown in FIG. 1. A method of paying insurance is selected on the displayed screen in step 135, if payment by electronic money is selected by pressing a transaction key 153 shown in FIG. 15, the transactor's insurance card is input via the card input apparatus 12 in step 136 and the sum equivalent to "–10,000 yen" stored in the item of the shortfall of the balance 145 in a balance comparison table shown in FIG. 14C is paid by electronic money in a step 137. If no method of payment is set, the transactor is automatically joined in a bank card loan or the credit of a credit card issuance company. If the transactor is joined in the bank card loan, his/her account for a card loan is opened in step 138, the sum equivalent to the shortfall of the balance is supplied in step 139 and the contract is continued. If the transactor is joined in the credit of a credit card issuance company, his/her account for the credit card is opened in step 140, the sum equivalent to the shortfall of the balance is supplied in step 141 and the contract is continued.

When a transaction key 156 showing automatic entry preset by the server 4 shown in FIG. 1 is selected by a transactor, the automatic entry is itemized. The transactor can allocate the sum of a loan respectively to card loan and the credit of a credit card in view of each annual interest and can enter the respective allocated sums in the balance of card loan 146 shown in FIG. 14D and the balance of a credit card 147 shown in FIG. 14E by pressing both transaction keys 154 and 155. Further, if no method of payment is set in the step 135 and no payment is made, the contract is automatically voided in step 142.

Finally, the cancellation of an insurance contract will be described referring to FIGS. 1, 16 and 17.

Figure 16:
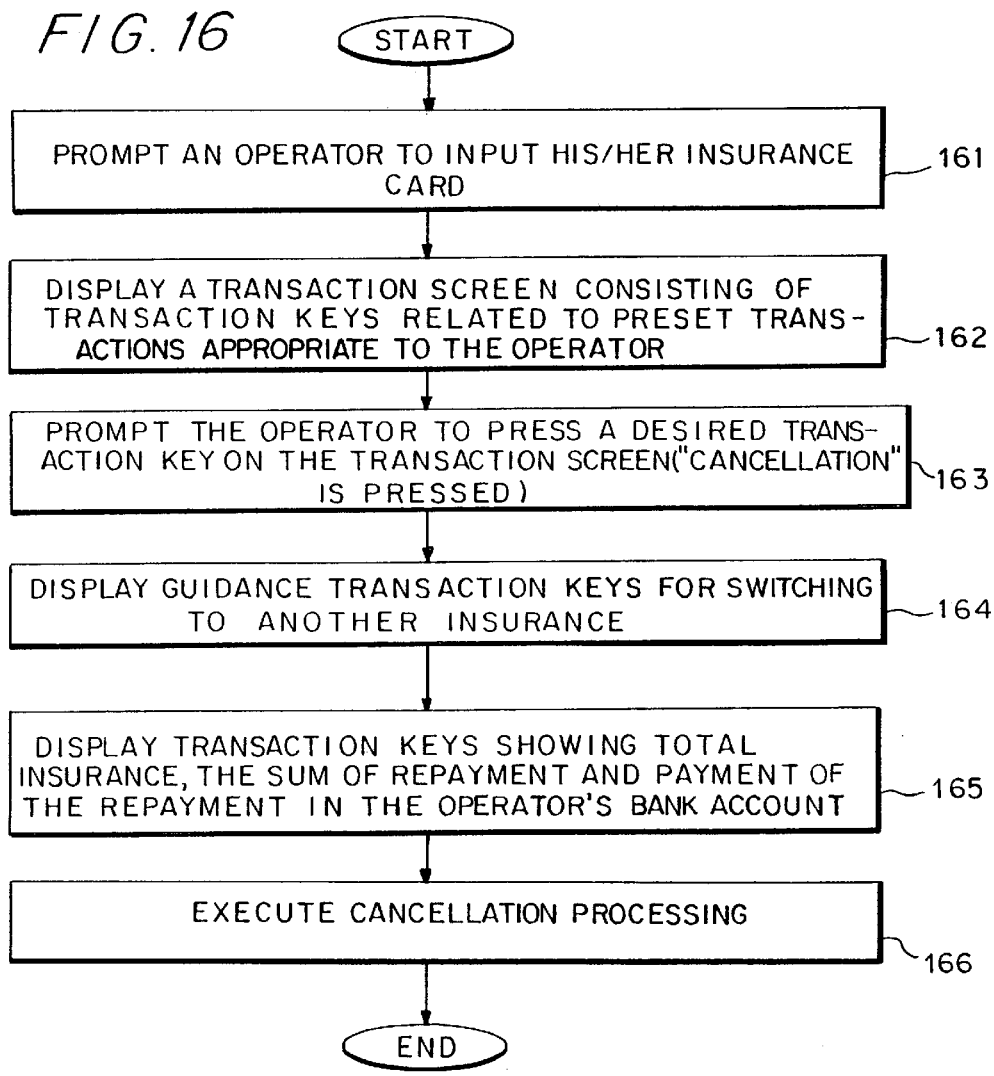
FIG. 16 illustrates the flow of processing showing an embodiment related to the cancellation of an insurance contract according to the present invention.
Figure 17A:
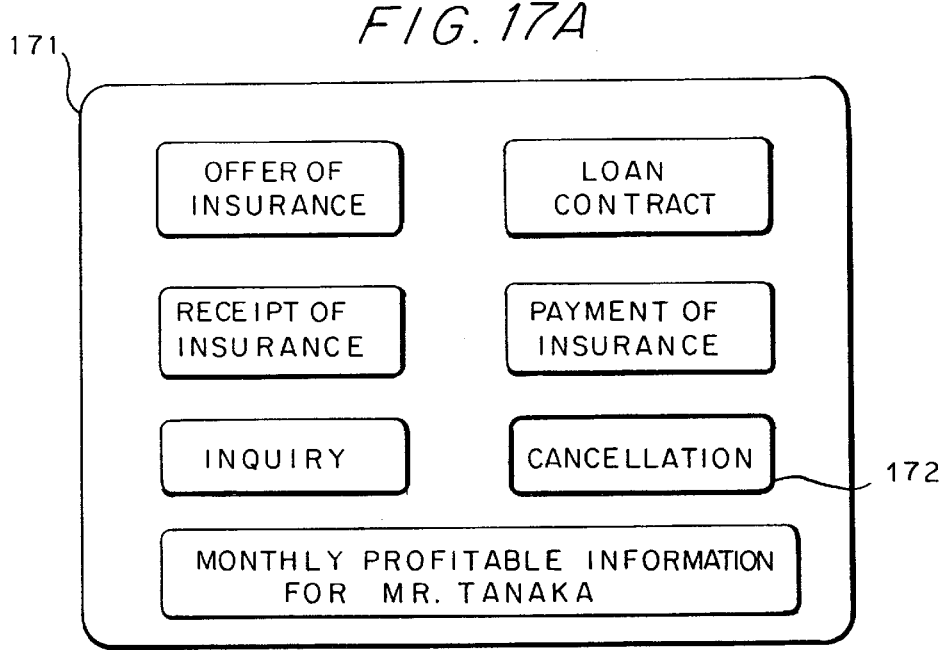
FIGS. 17A–17C illustrate a transaction screen including a transaction key "CANCELLATION", an another insurance switching guidance screen and a total insurance/canceled repayment guidance screen.
Figure 17B:
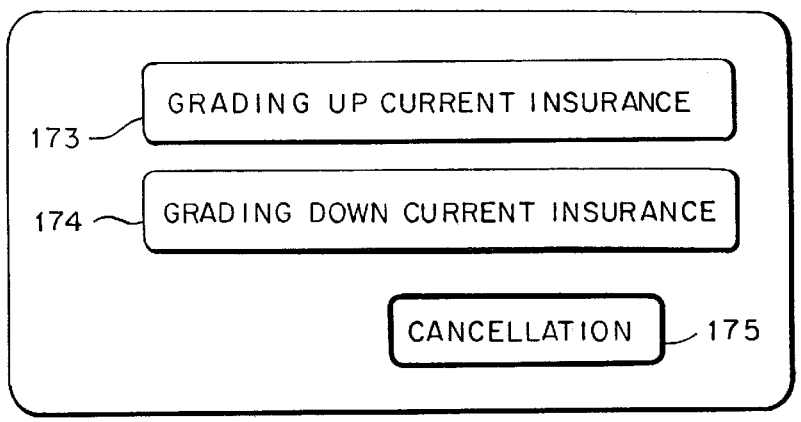
Figure 17C:
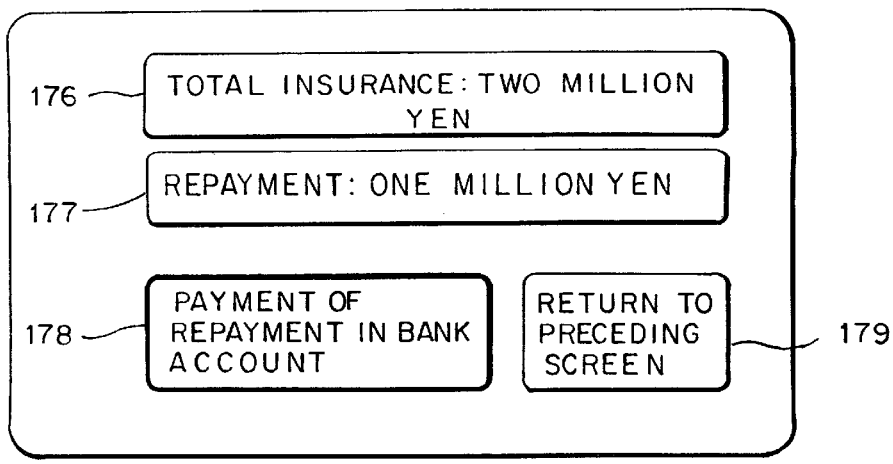

As shown in FIG. 16, first the insurance card of a transactor is input via the card input means 12 in step 161. Next, a transaction screen 171 including a transaction key "CANCELLATION" 172 shown in FIG. 17A is displayed on the display means 10 in a step 162 and the transaction key "CANCELLATION" on this transaction screen is selected by entry via the keypad entry means 11 or others in step 163. As a result, guidance transaction keys shown in FIG. 17B for switching to another insurance are displayed on the display means 10 in step 164. If a transaction key 173 or a transaction key 174 shown in FIG. 17B is pressed, the information related to the pressed transaction key is displayed. The size of the transaction keys for switching to another insurance is set beforehand so that it is larger than the size of the transaction key showing cancellation 175. When "CANCELLATION" is pressed at this time, total insurance 176, repayment 177 by cancellation and a transaction key 178 for guiding transactors in paying the repayment in their bank account are displayed in step 165 as a total insurance/canceled repayment guidance screen shown in FIG. 17C. When this payment guidance transaction key 178 is selected, processing for cancellation is executed in step 166, however, when a transaction key "RETURN TO PRECEDING SCREEN" 179 is selected, the insurance contact can be switched to another insurance on the another insurance switching guidance screen shown in FIG. 17B.

In this embodiment, the case that a shortfall is paid by electronic money is described, however, if a premium is paid, a method reverse to the case is used. That is, electronic money stored in a transactor's insurance card input by him/her is stored in the server 4 via the network 5.

Preferred embodiments related to a variety of insurance transactions according to the present invention are described above, however, the embodiments particularly related to payment can be applied to bank transactions and credit card transactions. The processing which is similar to the processing according to the present invention can be also performed using ATM installed in a bank.

As described in detail above, according to the present invention, plural cards issued by different industries can be utilized by one transaction terminal and a method of processing plural types of transactions using a card which enables the efficient performance of a variety of insurance transactions can be provided.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. A method of processing a transaction with plural institutions via a transaction processor using plural transaction cards, said method comprising the steps of:

receiving a first transaction card of a transactor;

inputting and then checking identification numbers corresponding to said first transaction card;

displaying a screen which includes a plurality of transaction keys;

permitting said transactor to select a transaction key of a desired transaction;

receiving one or more other transaction cards further required for said desired transaction;

judging whether identification numbers corresponding to said one or more other transaction cards in accordance with said desired transaction selected in said permitting step are required to be entered; and executing transaction processing between one or more of said institutions based on the input of identification numbers of said first transaction card or the input of identification numbers of said one or more other transaction cards required to be entered.

2. A method according to claim 1, further comprising the step of:

if transaction processing of said one or more other transaction cards is not related to withdrawal of cash, omitting input of personal identification numbers of said one or more other transaction cards when said transaction processing is executed.

3. A method according to claim 2, further comprising the step of:

if transaction processing of said one or more other transaction cards is related to withdrawal of cash, inputting personal identification numbers of said one or more other transaction cards when said transaction processing is executed.

4. A method according to claim 3, further comprising the steps of:

storing attribute information related to said transactor in said transaction card; and changing a selective screen for transactions depending upon said attribute information.

5. A method according to claim 3, wherein said transactions include loan transactions from plural financial institutions, and wherein said method further comprises the steps of:

when loan processing is selected, calculating a total loanable sum of plural transaction cards;

displaying said total loanable sum;

prompting said transactor to enter a sum to be loaned; and executing loan transaction processing by allocating the entered sum to plural financial institutions.

6. A method according to claim 1, wherein said transactions include inquiry transactions from plural financial institutions, and wherein said method further comprises the steps of:

when said inquiry transaction is selected, merging attribute information and transaction information of said transaction card;

totalizing said attribute information held by said plural financial institutions; and displaying said totalized attribute information.

7. A method according to claim 1, wherein said transactions include a payment of insurance transactions, and wherein said method further comprises the steps of:

when transaction of payment of insurance is selected, determining whether said payment of insurance is to be deposited in a bank; and when said payment of insurance is to be deposited in said bank, automatically opening an account of said bank.

8. A method according to claim 7, further comprising the steps of:

when said in said bank is opened, receiving information of an application entered by said transactor; and if signature or a seal by said transactor of another bank card or a credit card has been stored, executing a transaction processing for a new insurance contract based upon said signature or seal and a balance of said account of said transaction.

9. A method according to claim 1, wherein said transactions include payment of insurance transactions, and wherein said method further comprises the step of:

if a balance of a bank account of said transaction is short of a required payment, executing transaction processing for obtaining a bank card loan or a credit card issued by a credit card issuance company.

10. A method according to claim 1, wherein said transactions include cancellation transactions for cancelling insurance, and wherein said method further comprises the step of:

when cancellation transaction is selected and information for cancelling insurance is entered by said transactor, executing transaction processing for transferring a total insurance or repayment to a bank account of said transactor.

11. A method according to claim 1, wherein each transaction card comprises:

a magnetic stripe for storing attribute information of transactions which can be conducted by said transactor with said institutions;

a first integrated circuit (IC) chip for storing a record of electronic money in possession of said transactor; and a second IC chip which stores a record of transactions conducted by said transactor with said institutions.

12. A transaction system for performing a transaction with plural institutions using plural transaction cards, said transaction system comprising:

a server;

a database connected to said server, said database stores attribute information of transactions which can be conducted by transactors with said institutions;

a plurality of transaction processors for permitting a transactor to perform transactions with said institutions using one or plural transaction cards; and a network which interconnects said server with said transaction processors, wherein each transaction processor receives a first transaction card of a transactor, inputs and then checks identification numbers corresponding to said first transaction card based on attribute information retrieved from said database by said server, displays a screen which includes a plurality of transaction keys based on attribute information retrieved by said server, permits said transactor to select a transaction key of a desired transaction, receives one or more other transaction cards required for said desired transaction, judges whether identification numbers corresponding to said one or more other transaction cards in accordance with said desired transaction are required to be entered based upon attribute information retrieved by said server from said database and executes transaction processing between one or more of said institutions based on attribute information retrieved by said server from said database and the input of identification numbers of said first transaction card or the input of identification numbers of said one or more other transaction cards required to be entered.

13. A transaction system according to claim 12, wherein said transaction processor, if transaction processing of said one or more other transaction cards is not related to withdrawal of cash, omits input of personal identification numbers of said one or more other transaction cards when said transaction processing is executed.

14. A transaction system according to claim 13, wherein said transaction processor, if transaction processing of said one or more other transaction cards is related to withdrawal of cash, inputs personal identification numbers of said one or more other transaction cards when said transaction processing is executed.

15. A transaction system according to claim 14, wherein said transaction processor stores attribute information related to said transactor in said transaction card, and changes a selective screen for transactions depending upon said attribute information.

16. A transaction system according to claim 14, wherein said transactions include loan transactions from plural financial institutions, and wherein said transaction processor, when loan processing is selected, calculates a total loanable sum of plural transaction cards, displays said total loanable sum, prompts said transactor to enter a sum to be loaned, and executes loan transaction processing by allocating the entered sum to plural financial institutions.

17. A transaction system according to claim 12, wherein said transactions include inquiry transactions from plural financial institutions, and wherein said transaction processor, when said inquiry transaction is selected, merges attribute information and transaction information of said transaction card, totals said attribute information held by said plural financial institutions, and displays said totalized attribute information.

18. A transaction system according to claim 12, wherein said transactions include a payment of insurance transactions, and wherein said transaction processor, when transaction of payment of insurance is selected, determines whether said payment of insurance is to be deposited in a bank, and when said payment of insurance is to be deposited in said bank, automatically opens an account in said bank.

19. A transaction system according to claim 18, wherein said transaction processor, when said in said account bank is opened, receives information of an application entered by said transactor, and if signature or a seal by said transactor of another bank card or a credit card has been stored in said database, executes a transaction processing for a new insurance contract based upon said signature or seal and a balance of said account of said transaction.

20. A transaction system according to claim 12, wherein said transactions include payment of insurance transactions, and wherein said transaction processor, if a balance of a bank account of said transaction is short of a required payment, executes transaction processing for obtaining a bank card loan or a credit card issued by a credit card issuance company.

21. A transaction system according to claim 12, wherein said transactions include cancellation transactions for cancelling insurance, and wherein said transaction processor, when cancellation transaction is selected and information for cancelling insurance is entered by said transactor, executes transaction processing for transferring a total insurance or repayment to a bank account of said transactor.

22. A transaction system according to claim 12, wherein each transaction card comprises:
   a magnetic stripe for storing attribute information of transactions which can be conducted by said transactor with said institutions;
   a first integrated circuit (IC) chip for storing a record of electronic money in possession of said transactor; and
   a second IC chip which stores a record of transactions conducted by said transactor with said institutions.

23. A computer program stored on a storage medium for execution in a transaction system to cause said transaction system to perform a transaction with plural institutions using plural transaction cards, said computer program when executed in said transaction system causes said transaction system to perform the steps of:
   receiving a first transaction card of a transactor;
   inputting and then checking identification numbers corresponding to said first transaction card;
   displaying a screen which includes a plurality of transaction keys;
   permitting said transactor to select a transaction key of a desired transaction;
   receiving one or more other transaction cards required for said desired transaction;
   judging whether identification numbers corresponding to said one or more other transaction cards in accordance with said desired transaction selected in said permitting step are required to be entered; and
   executing transaction processing between one or more of said institutions based on the input of identification numbers of said first transaction card or the input of identification numbers of said one or more other transaction cards required to be entered.

24. A computer program according to claim 23, wherein said computer program when executed further causes said transaction system to perform the step of:
   if transaction processing of said one or more other transaction cards is not related to withdrawal of cash, omitting input of personal identification numbers of said one or more other transaction cards when said transaction processing is executed.

25. A computer program according to claim 24, wherein said computer program when executed further causes said transaction system to perform the step of:
   if transaction processing of said one or more other transaction cards is related to withdrawal of cash, inputting personal identification numbers of said one or more other transaction cards when said transaction processing is executed.

26. A computer program according to claim 25, wherein said computer program when executed further causes said transaction system to perform the steps of:
   storing attribute information related to said transactor in said transaction card; and
   changing a selective screen for transactions depending upon said attribute information.

27. A computer program according to claim 25, wherein said transactions include loan transactions from plural financial institutions, and wherein said computer program when executed further causes said transaction system to perform the steps of:
   when loan processing is selected, calculating a total loanable sum of plural transaction cards;
   displaying said total loanable sum;
   prompting said transactor to enter a sum to be loaned; and
   executing loan transaction processing by allocating the entered sum to plural financial institutions.

28. A computer program according to claim 23, wherein said transactions include inquiry transactions from plural financial institutions, and wherein said computer program when executed further causes said transaction system to perform the steps of:
   when said inquiry transaction is selected, merging attribute information and transaction information of said transaction card;

totalizing said attribute information held by said plural financial institutions; and displaying said totalized attribute information.

29. A computer program according to claim 23, wherein said transactions include a payment of insurance transactions, and wherein said computer program when executed further causes said transaction system to perform the steps of:

when transaction of payment of insurance is selected, determining whether said payment of insurance is to be deposited in a bank; and when said payment of insurance is to be deposited in said bank, automatically opening an account in said bank.

30. A method according to claim 29, wherein said computer program when executed further causes said transaction system to perform the steps of:

when said account in said bank is opened, receiving information of an application entered by said transactor; and if signature or a seal by said transactor of another bank card or a credit card has been stored, executing a transaction processing for a new insurance contract based upon said signature or seal and a balance of said account of said transaction.

31. A computer program according to claim 23, wherein said transactions include payment of insurance transactions, and wherein said computer program when executed further causes said transaction system to perform the step of:

if a balance of a bank account of said transaction is short of a required payment, executing transaction processing for obtaining a bank card loan or a credit card issued by a credit card issuance company.

32. A computer program according to claim 23, wherein said transactions include cancellation transactions for cancelling insurance, and wherein said computer program when executed further causes said transaction system to perform the step of:

when cancellation transaction is selected and information for cancelling insurance is entered by said transactor, executing transaction processing for transferring a total insurance or repayment to a bank account of said transactor.

33. A computer program according to claim 23, wherein said transaction system comprises:

a server connected to a database which stores attribute information;

a plurality of transaction processors each transaction processor executes transaction processing with said institutions using one or more transaction cards based on input from a transactor and attribute information retrieved by said server from said database; and a network which interconnects said server and said transaction processors.

34. A computer program according to claim 33 wherein said computer program is executed by said server.

35. A computer program according to claim 33, wherein said computer program is executed in each of said transaction processors.

36. A computer program according to claim 23, wherein each transaction card comprises:

a magnetic stripe for storing attribute information of transactions which can be conducted by said transactor with said institutions;

a first integrated circuit (IC) chip for storing a record of electronic money in possession of said transactor; and a second IC chip which stores a record of transactions conducted by said transactor with said institutions.

37. A transaction processor for use in a transaction system for performing a transaction with plural institutions using plural transaction cards, said transaction system includes a server, a database connected to said server, said database stores attribute information of transactions which can be conducted by transactors with said institutions, a plurality of said transaction processors and a network which interconnects said server with said transaction processors, said transaction processor comprising:

a display;

a card reader;

an input apparatus; and a controller with controls and display, card reader and input apparatus such that said transaction processor receives a first transaction card of a transactor, inputs and then checks identification numbers corresponding to said first transaction card based on attribute information retrieved from said database by said server, displays a screen which includes a plurality of transaction keys based on attribute information retrieved by said server, permits said transactor to select a transaction key of a desired transaction, receives one or more other transaction cards required for said desired transaction, judges whether identification numbers corresponding to said one or more other transaction cards in accordance with said desired transaction are required to be entered based upon attribute information retrieved by said server from said database and executes transaction processing between one or more of said institutions based on attribute information retrieved by said server from said database and the input of identification numbers of said first transaction card or the input of identification numbers of said one or more other transaction cards required to be entered.

38. A transaction processor according to claim 37, wherein said controller, if transaction processing of said one or more other transaction cards is not related to withdrawal of cash, omits input of personal identification numbers of said one or more other transaction cards when said transaction processing is executed.

39. A transaction processor according to claim 38, wherein said controller, if transaction processing of said one or more other transaction cards is related to withdrawal of cash, inputs personal identification numbers of said one or more other transaction cards when said transaction processing is executed.

40. A transaction processor according to claim 39, wherein said controller stores attribute information related to said transactor in said transaction card, and changes a selective screen for transactions depending upon said attribute information.

41. A transaction processor according to claim 39, wherein said transactions include loan transactions from plural financial institutions, and wherein said controller, when loan processing is selected, calculates a total loanable sum of plural transaction cards, displays said total loanable sum, prompts said transactor to enter a sum to be loaned, and executes loan transaction processing by allocating the entered sum to plural financial institutions.

42. A transaction processor according to claim 37, wherein said transactions include inquiry transactions from plural financial institutions, and wherein said controller, when said inquiry transaction is selected, merges attribute information and transaction information of said transaction card, totals said attribute information held by said plural financial institutions, and displays said totalized attribute information.

43. A transaction processor according to claim 37, wherein said transactions include a payment of insurance transactions, and wherein said controller, when transaction of payment of insurance is selected, determines whether said payment of insurance is to be deposited in a bank, and when said payment of insurance is to be deposited in said bank, automatically opens an account in said bank.

44. A transaction processor according to claim 43, wherein said controller, when said in said bank is opened, receives information of an application entered by said transactor, and if signature or a seal by said transactor of another bank card or a credit card has been stored in said database, executes a transaction processing for a new insurance contract based upon said signature or seal and a balance of said account of said transaction.

45. A transaction processor according to claim 37, wherein said transactions include payment of insurance transactions, and wherein said controller, if a balance of a bank account of said transaction is short of a required payment, executes transaction processing for obtaining a bank card loan or a credit card issued by a credit card issuance company.

46. A transaction processor according to claim 37, wherein said transactions include cancellation transactions for cancelling insurance, and wherein said controller, when cancellation transaction is selected and information for cancelling insurance is entered by said transactor, executes transaction processing for transferring a total insurance or repayment to a bank account of said transactor.

47. A transaction processor according to claim 37, wherein each transaction card comprises:
- a magnetic stripe for storing attribute information of transactions which can be conducted by said transactor with said institutions;
- a first integrated circuit (IC) chip for storing a record of electronic money in possession of said transactor; and
- a second IC chip which stores a record of transactions conducted by said transactor with said institutions.

* * * * *